(12) United States Patent
Heurich et al.

(10) Patent No.: US 9,109,696 B2
(45) Date of Patent: Aug. 18, 2015

(54) GEAR ACTUATOR

(75) Inventors: Mike Heurich, Apelern (DE); Reiner Hölscher, Seelze (DE); Holger Kelpe, Hannover (DE); Ingo Meyer, Rehburg-Loccum (DE); Marcus Schulz, Neustadt (DE); Andreas Sievers, Sehnde (DE); Jan Spremberg, Sarstedt (DE); Tino Wiggers, Seelze (DE)

(73) Assignee: WABCO GmbH, Hannover (DE)

( * ) Notice: Subject to any disclaimer, the term of this patent is extended or adjusted under 35 U.S.C. 154(b) by 200 days.

(21) Appl. No.: 12/735,223

(22) PCT Filed: Oct. 23, 2008

(86) PCT No.: PCT/EP2008/008975
§ 371 (c)(1),
(2), (4) Date: Sep. 15, 2010

(87) PCT Pub. No.: WO2009/086856
PCT Pub. Date: Jul. 16, 2009

(65) Prior Publication Data
US 2011/0113912 A1    May 19, 2011

(30) Foreign Application Priority Data

Jan. 4, 2008  (DE) .................. 10 2008 003 193

(51) Int. Cl.
*B60K 3/00* (2006.01)
*F16H 61/28* (2006.01)
*F16H 61/30* (2006.01)
*F16H 63/20* (2006.01)

(Continued)

(52) U.S. Cl.
CPC ............. *F16H 61/28* (2013.01); *F16H 61/30* (2013.01); *F16H 63/20* (2013.01); *F16H 63/38* (2013.01); *F16H 2063/005* (2013.01); *Y10T 74/20018* (2015.01); *Y10T 74/20024* (2015.01)

(58) Field of Classification Search
CPC ... F16H 2063/005; F16H 61/28; F16H 63/20; F16H 63/38; F16H 61/30
USPC .................. 74/473.11, 473.1, 473.29, 473.34
IPC ...................................................... F16H 61/28
See application file for complete search history.

(56) References Cited

U.S. PATENT DOCUMENTS

| 5,281,902 A | * | 1/1994 | Edelen et al. ................. 318/632 |
| 5,878,622 A | * | 3/1999 | Tischer .......................... 74/335 |
| 6,065,363 A | * | 5/2000 | Schaller et al. ............ 74/473.12 |

(Continued)

FOREIGN PATENT DOCUMENTS

| DE | 103 50 938 A1 | 5/2005 |
| FR | 2313607 A | 2/1977 |
| WO | WO 03062677 A | 7/2003 |

*Primary Examiner* — William Kelleher
*Assistant Examiner* — Zakaria Elahmadi
(74) *Attorney, Agent, or Firm* — Kramer Levin Naftalis & Frankel LLP

(57) ABSTRACT

A gear actuator for shifting a gear includes an alley switch actuator, a gear switch actuator and a shift finger, which can be moved by the alley switch actuator and the gear switch actuator for the purpose of transferring a switching movement to the gear. An alley switch sliding element is connected with the alley switch actuator, and a gear switch sliding element is connected with the gear shift actuator. The shift finger is supported movably at the alley switch sliding element and at the gear switch sliding element.

21 Claims, 6 Drawing Sheets

(51) Int. Cl.
*F16H 63/38* (2006.01)
*F16H 63/00* (2006.01)

(56) References Cited

U.S. PATENT DOCUMENTS

| | | | |
|---|---|---|---|
| 6,167,773 B1 * | 1/2001 | Dorfschmid et al. | 74/473.11 |
| 6,327,927 B1 * | 12/2001 | Rogg et al. | 74/335 |
| 6,397,698 B1 * | 6/2002 | Kamiya et al. | 74/473.11 |
| 6,892,598 B2 * | 5/2005 | Mepham et al. | 74/473.11 |
| 6,904,823 B2 * | 6/2005 | Levin et al. | 74/471 XY |
| D584,666 S * | 1/2009 | Stender | D12/180 |
| D586,272 S * | 2/2009 | Schulz | D12/180 |
| 7,493,992 B2 * | 2/2009 | Rogers | 188/71.5 |
| D600,179 S * | 9/2009 | Schulz et al. | D12/180 |
| 8,051,734 B2 * | 11/2011 | Schnitzer | 74/335 |
| 8,061,231 B2 * | 11/2011 | Fischer et al. | 74/473.21 |
| D661,631 S * | 6/2012 | Bohm et al. | D12/180 |
| 2001/0037696 A1 * | 11/2001 | Meyer et al. | 74/335 |
| 2004/0254040 A1 * | 12/2004 | Somschor et al. | 475/149 |
| 2005/0082134 A1 * | 4/2005 | Bigi | 192/3.56 |
| 2008/0236322 A1 * | 10/2008 | Jeng et al. | 74/473.11 |
| 2009/0301248 A1 * | 12/2009 | Mohr et al. | 74/473.11 |
| 2010/0012409 A1 * | 1/2010 | Heidenreich et al. | 180/65.265 |
| 2010/0212447 A1 * | 8/2010 | Giefer et al. | 74/473.11 |
| 2010/0307276 A1 * | 12/2010 | Giefer et al. | 74/473.3 |
| 2011/0232409 A1 * | 9/2011 | Sueshige et al. | 74/473.11 |

* cited by examiner

GEAR ACTUATOR

FIELD OF THE INVENTION

The present invention generally relates to a gear actuator for shifting a transmission in which the actuator has a gate shifting drive, a gear shifting drive, and a selector finger that can be moved by the gate shifting drive and by the gear shifting drive for transmitting a shifting movement to the transmission.

BACKGROUND OF THE INVENTION

Known gear actuators of the general type under consideration have a selector finger that is mounted pivotably on a shifting drive and that converts a linear movement of the shifting drive into a pivoting movement. Pivoting of the selector finger leads to changing of a gear or a gate of the transmission.

It is a disadvantage of known gear actuators that they have to be tailored individually to the respective transmission. Previously, it has not involved any great disadvantage, since gear actuators are installed in serial production in trucks, for example. If, however, existing trucks having manual transmissions are to be retrofitted with gear actuators, a new gear actuator has to be constructed for each transmission, which is complicated and expensive. In addition, the individuality of the gear actuators leads to complex stock keeping.

SUMMARY OF THE INVENTION

Generally speaking, it is an object of the present invention to overcome disadvantages associated with the prior art. In accordance with embodiments of the present invention, this is achievable by means of a gear actuator comprising a gate shifting displacement piece connected to the gate shifting drive, and a gear shifting displacement piece connected to the gear shifting drive, the selector finger being mounted on the gate shifting displacement piece and the gear shifting displacement piece such that it is guided displaceably.

An advantage of the inventive gear actuator is its capability to be modularized. As a result of the selector finger being mounted in a displaceably guided manner, different shifting paths in different transmissions, for example, can be set easily by the shifting movement being limited by stops, for example. One gear actuator can therefore be used for many different types of transmissions. It is a further advantage that the inventive gear actuator is robust and has a simple construction. In addition, it can be assembled easily from standard components. Also, the foregoing results in low warehouse and logistics expenditure in the maintenance of inventive gear actuators.

In the context of the present description, a gate shifting drive is understood to mean, in particular, an automatic drive that is constructed and arranged such that a gate of the transmission can be changed with its aid if the gear actuator is mounted on the transmission. Analogously, a gear shifting drive is understood to mean, in particular, an automatic drive that is configured for shifting between two gears of the transmission.

A selector finger is understood to mean, in particular, every component that transmits the shifting movement of the gear actuator to the transmission. To this end, the selector finger does not have to be of finger-like configuration. It is also possible that the selector finger comprises a corresponding mating piece of the transmission or is coupled mechanically to it in a different way.

It is possible, but not necessary, that the selector finger is arranged between the gear shifting displacement piece and the gate shifting displacement piece. In this case, the selector finger can be mounted by means of a linear guide on the gear shifting displacement piece firstly and by way of a further linear guide on the gate shifting displacement piece such that it is guided displaceably. A particularly simple construction results if the guides are straight linear guides that extend along a straight line.

According to one embodiment of the present invention, the gate shifting drive has a gate shifting working direction, and the gear shifting drive has a gear shifting working direction that extends substantially perpendicularly with respect to the gate shifting working direction. The gate shifting working direction is that movement direction in which the gate shifting drive performs a movement in order to change the gate of the transmission by means of the selector finger. Analogously, the gear shifting working direction is that movement direction in which the gear shifting drive performs a working movement with the selector finger in order that the selector finger changes a gear on the transmission.

The gate and gear shifting drives are desirably configured as linear drives that perform a linear working movement. The gate shifting working direction and the gear shifting working direction are advantageously parallel to a gate shifting guiding direction and a gear shifting guiding direction, respectively, at which the selector finger is mounted on the gate shifting displacement piece and on the gear shifting displacement piece, respectively, such that it is guided in a linearly displaceable manner.

In one embodiment, the selector finger is mounted on the gate shifting displacement piece and the gear shifting displacement piece such that it is guided by means of a frictional connection. This is to be understood as meaning, in particular, that the selector finger slides in the gate shifting displacement piece and gear shifting displacement piece. However, it is also possible that the selector finger is mounted on the gate shifting displacement piece and the gear shifting displacement piece via components that reduce friction, for example via balls mounted in a cage.

A particularly compact construction, in which only small tilting moments are produced and which is therefore particularly low-wear, is obtained if the selector finger extends through a displacement piece, in particular, the gate shifting displacement piece. It is particularly favorable if the selector finger extends through the displacement piece centrally. That is a recess, through which the selector finger protrudes, is provided in the displacement piece—the recess surrounding the geometric centroid of the displacement piece.

It is a particular advantage of the inventive gear actuator that components that are used frequently in gear actuators can be arranged particularly simply. Thus, according to one embodiment, the gear actuator has a securing piece for ensuring that the selector finger always engages only into one gear selector rod of the transmission. Transmissions as a rule have one selector rod for each gate. In order to prevent transmission damage, it is advantageous to provide the securing piece.

The securing piece is advantageously attached to one of the displacement pieces, in particular to the gate displacement piece. This attachment is possible in a considerably simpler way than the attachment of securing pieces to conventional gear actuators.

In order for it to be possible to change the gate simply by way of the selector finger, in order therefore for it to be possible, in particular, to move the selector finger simply out of engagement with one transmission rod into engagement with another transmission rod, the gear actuator according to one preferred embodiment has a latching contour, a displacement piece, in particular the gear displacement piece, having a prestressed latching pin that interacts with the latching contour for latching the selector finger in a predefined position in the gear shifting working direction. The latching pin is prestressed, for example, by way of a spring that presses it outward out of the gear displacement piece. The latching pin engages into the latching contour by way of a tip that protrudes out of the gear displacement piece in order to latch the gear displacement piece M a position in which the gate can be changed particularly easily.

In one embodiment, the gate shifting drive comprises a gate shifting cylinder, in particular a gate shifting pneumatic cylinder or a gate shifting hydraulic cylinder. As an alternative, an electric drive can be provided. Examples are a linear direct drive or an electric motor with a transmission for converting a rotational movement of the electric motor into a linear movement. The gear shifting drive is preferably constructed in the same way as the gate shifting drive.

A gear actuator that can be used in a particularly flexible way is obtained if the gear shifting cylinder has a first set of valve connections arranged on a first lateral side of the gear shifting cylinder, and a second set of valve connections arranged on a second lateral side of the gear shifting cylinder that lies opposite the first lateral side, the gear shifting cylinder being configured such that a non-synchronized transmission can be shifted by means of the first set of valve connections, and a synchronized transmission can be shifted by means of both sets of valve connections.

The gear actuator preferably has a gate drive stop for limiting a maximum gate drive movement path of the gate drive in the gate shifting working direction. This advantageously achieves a situation where the gear actuator can be used for transmissions, the shifting travel of which is smaller than a gate drive stroke of the gate drive of the drive. The gate drive stroke is meant as the spacing between the two extreme positions that the gate drive can assume. A gear actuator of this type is advantageously provided with a gate shifting pneumatic cylinder. In this case, the selector finger comes into contact with the gate drive stop, with the result that the stroke is limited solely by the provision of the gate drive stop without further regulating expenditure.

Analogously, the gear actuator preferably comprises, as an alternative or in addition, a gear drive stop for limiting a maximum gear drive stroke of the gear drive in the gear shifting working direction.

In addition, the present invention encompasses a transmission system having a transmission and a gear actuator, the gear actuator being connected to the transmission by means of an adapter. The gear actuator can but does not have to have the abovementioned properties. It is thus possible in principle also to connect gear actuators with a pivotable selector finger to a transmission via an adapter. An advantage of this is that a gear actuator can be used for different transmissions. The adapter can be connected releasably to the gear actuator (e.g., screwed).

The gear drive stop is preferably formed on or fastened to the adapter. Analogously, in addition or as an alternative, the gate drive stop is formed on or fastened to the adapter. In order to customize a gear actuator of this type to an existing transmission that is to be shifted manually, it is sufficient merely to customize the adapter.

Still other objects and advantages of the present invention will in part be obvious and will in part be apparent from the specification.

The present invention accordingly comprises the features of construction, combination of elements and arrangement of parts, all as exemplified in the constructions herein set forth, and the scope of the invention will be indicated in the claims.

BRIEF DESCRIPTION OF THE DRAWINGS

In the following text, exemplary embodiments of the invention will be explained in greater detail with reference to the appended drawings, in which.

DETAILED DESCRIPTION OF THE PREFERRED EMBODIMENTS

Figure 1:
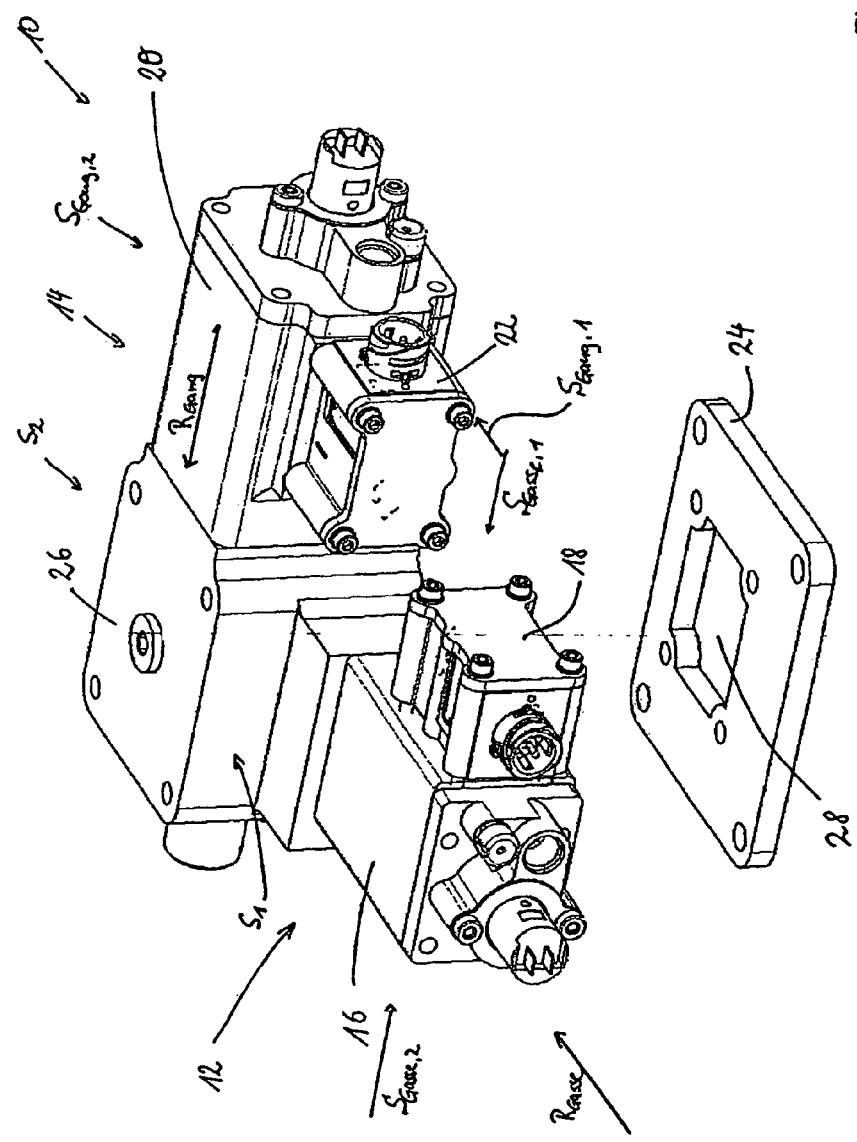
FIG. 1 is a perspective view of a gear actuator according to an embodiment of the present invention.

Referring now to the drawing figures, FIG. 1 shows a gear actuator 10 having a gate shifting drive 12 and a gear shifting drive 14. The gate shifting drive 12 has a gate shifting working direction $R_{Gasse}$ that extends perpendicularly with respect to a gear shifting working direction $R_{Gang}$ of the gear shifting drive 14. In a gear actuator according to the embodiment depicted in FIG. 1, the gate shifting drive 12 comprises a gate shifting pneumatic cylinder 16 that can be loaded with compressed air via a gate shifting compressed air inflow line and gate shifting valve unit 18. The gate shifting compressed air inflow line 18 comprises a first set of valve connections and is attached (e.g., screwed) to the gate shifting pneumatic cylinder 16 on a first lateral side $S_{Gasse, 1}$. As an alternative, the gate shifting compressed air inflow line 18 is mounted on an opposite side $S_{Gasse, 2}$.

The gear shifting drive 14 comprises a gear shifting pneumatic cylinder 20 that can be loaded with compressed air via a gear shifting compressed air inflow line and gear shifting valve unit 22 attached (e.g., screwed) to a first lateral side $S_{Gang, 1}$.

The gear shifting pneumatic cylinder 20 is configured to receive a second gear shifting compressed air inflow line (not shown) that has a second set of valve connections on a second lateral side $S_{Gang, 2}$ that lies opposite the first lateral side $S_{Gang, 1}$. The embodiment depicted in FIG. 1 is configured to shift a non-synchronized transmission (not shown). The second gear shifting compressed air inflow line is mounted to shift a synchronized transmission.

The gear actuator 10 comprises an adapter 24, by way of which it can be attached (e.g., screwed) to a commercial vehicle transmission (not shown), for example a truck transmission or a passenger car transmission.

The gate shifting pneumatic cylinder 16 and the gear shifting pneumatic cylinder 20 are attached (e.g., screwed) to a central body 26. The central body 26 has a recess that is connected to an adapter recess 28 of the adapter 24.

The central body 26 is configured such that the gate shifting drive 12 can be mounted both, as shown in FIG. 1, on a first side $S_1$ at a right angle to the gear shifting drive 14 and also on a side $S_2$ that lies opposite the first side $S_1$.

Figure 2:
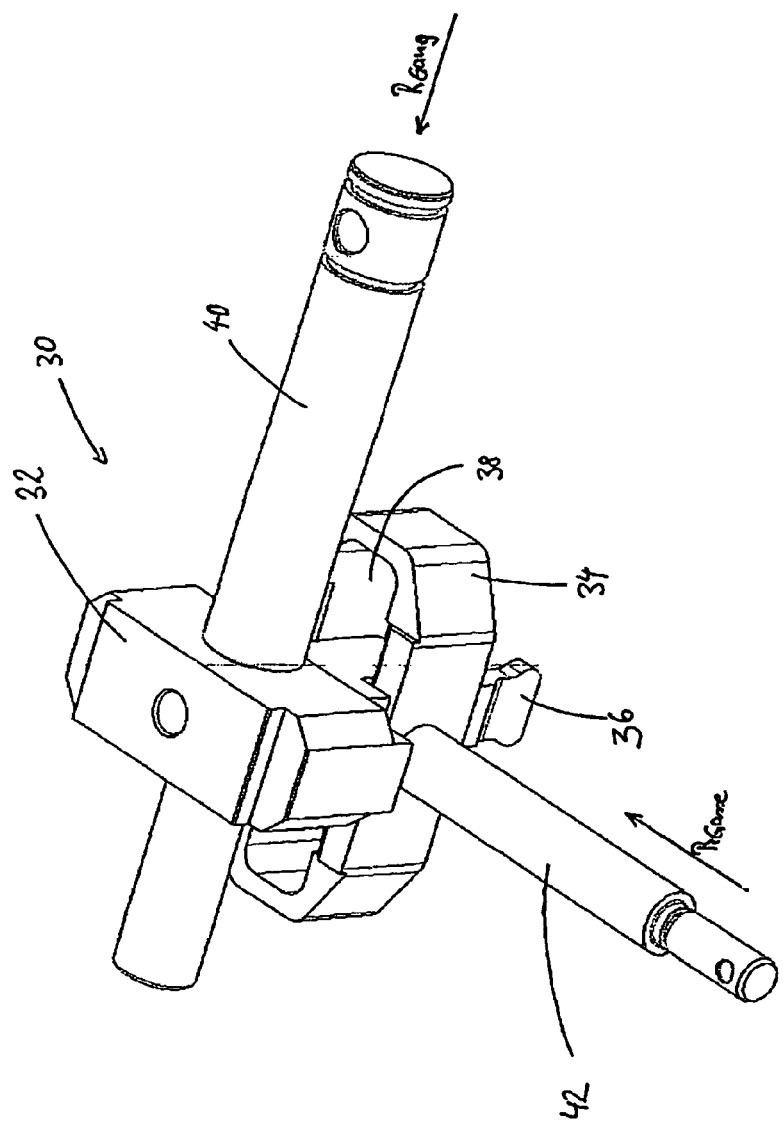
FIG. 2 is a detailed view of a coupler element of the gear actuator according to FIG. 1, including a gate shifting displacement piece and a gear shifting displacement piece.

FIG. 2 shows a coupler element 30 that has a gear shifting displacement piece 32 and a gate shifting displacement piece 34. In addition, the coupler element 30 has a selector finger 36 mounted on the gear shifting displacement piece 32 and on the gate shifting displacement piece 34 such that it is guided displaceably. To this end, the selector finger 36 extends through a displacement piece recess 38 of the gate shifting displacement piece 34 and is guided in the latter such that it can move relative to the gate shifting displacement piece 34 only in the gear shifting working direction $R_{Gang}$.

The gear shifting displacement piece 32 can be moved via a gear shifting cylinder piston 40 of the gear shifting pneumatic cylinder 20, which is not shown completely in FIG. 2 (cf. FIG. 1). The gate shifting displacement piece 34 can be moved in the gate shifting working direction $R_{Gasse}$ via a gate shifting cylinder piston 42 of the gate shifting pneumatic cylinder 16, which is likewise not shown completely in FIG. 2 (cf. FIG. 1), and is mounted in a linear guide in a displaceably guided manner for a movement of this type in the gear shifting displacement piece 32.

Figure 3:
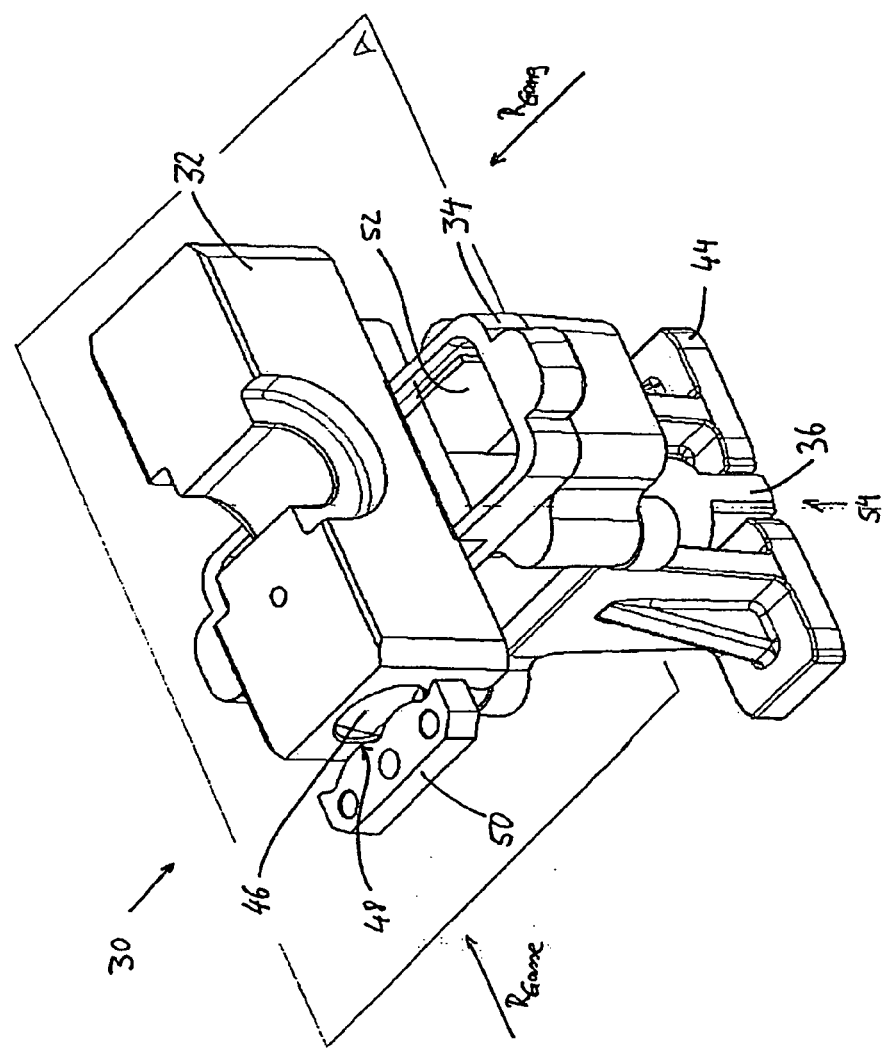
FIG. 3 is a further, more detailed view of a coupler element in accordance with an embodiment of the present invention.

FIG. 3 is a further perspective view of the coupler element 30, also showing a securing piece 44. The securing piece 44 is fastened to the gate shifting displacement piece 34 and is moved with the latter. If the selector finger 36 engages into a selector rod (not shown) of a transmission (likewise not shown), the securing piece 44 ensures that the selector finger 36 does not unintentionally engage into a second selector rod. Unlike prior art actuators, in the case of the inventive gear actuator, the securing piece 44 can be attached simply to the gate shifting displacement piece 34 or can even be formed integrally with it.

In addition, FIG. 3 shows a latching pin 46 that is received in the gear shifting displacement piece 32 and protrudes beyond the gear shifting displacement piece 32 with a tip that is partially concealed. The latching pin 46 interacts by way of its tip with a latching contour 48 of a latching piece 50, with the result that the selector finger 36 is held in a predefined position with regard to the gear shifting working direction $R_{Gang}$. The latching piece 50 is fastened, for example, to the central body 26 (cf. FIG. 1). The adapter 24 (cf. FIG. 1) is configured such that the selector finger 36 can change the gate if the latching pin 46 is in the latching position. As an alternative, the latching pin 46 is formed on the central body 26 and the gear shifting displacement piece 32 has the latching contour 48.

As can be seen in FIGS. 2 and 3, the selector finger 36 extends through the gate shifting displacement piece 34 substantially centrally, with the result that, in a zero position (shown in FIGS. 2 and 3) and in the case of an actuation of the gear shifting pneumatic cylinder 16 (cf. FIG. 1) and/or the gear shifting pneumatic cylinder 20 (cf. FIG. 1), only small tilting moments have to be absorbed by a first guide 52 (FIG. 3) of the selector finger 36 in the gear shifting displacement piece 34 and by a second guide (not visible in FIG. 3) in the gear shifting displacement piece 32.

Since, as a rule, a higher force has to be applied for shifting the gears of the transmission (not shown) than for shifting the gate, the gear shifting pneumatic cylinder 20 (FIG. 1) is designed to be larger than the gate shifting pneumatic cylinder 16. It is therefore advantageous to arrange the gear shifting displacement piece 32 on an end of the gate shifting displacement piece 34 that lies opposite an engagement end 43 of the selector finger 36. In other words, in the installed position of the gear actuator, the gate shifting displacement piece 34 is arranged closer to the transmission than the gear shifting displacement piece 32. In FIGS. 1 to 3, the transmission (not shown) is situated at the bottom in the operating position of the gear actuator. As an alternative, the gear actuator can be arranged at the bottom or to the side of the transmission in the operating position.

Figure 4:
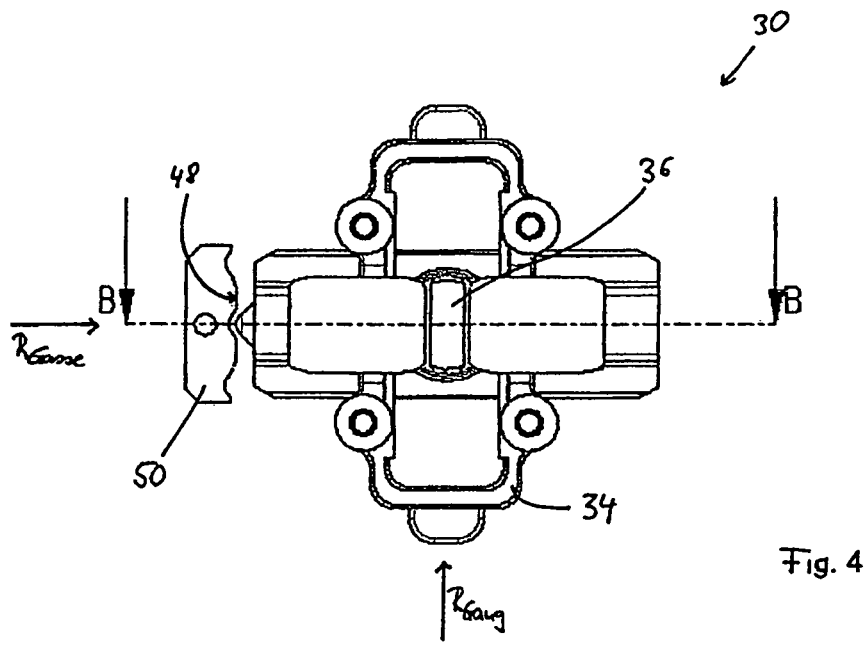
FIG. 4 shows a horizontal cross section through a coupler element according to an embodiment of the present invention.

FIG. 4 shows a cross section through the coupler element 30, through the plane A according to FIG. 3.

Figure 5:
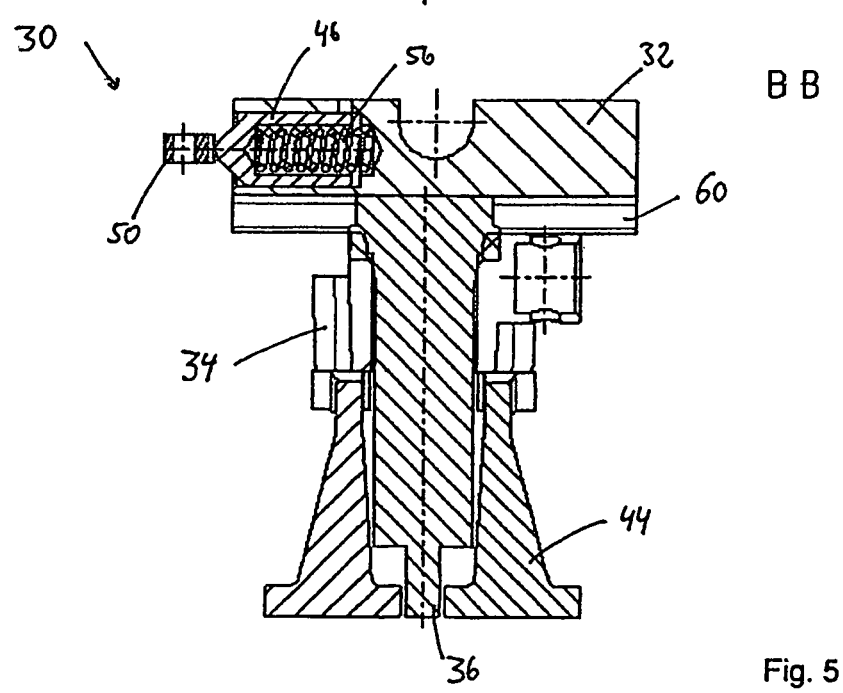
FIG. 5 shows a horizontal cross section through the coupler element according to FIG. 4.

FIG. 5 shows a cross section through the coupler element 30, along line B-B according to FIG. 4. It can be seen that the latching pin 46 has a spring 56 that lies on the inside and brings it into engagement with the latching piece 50 by way of its tip 58. In addition, FIG. 5 shows a second guide 60 between the selector finger 36 and the gear shifting displacement piece 32, which second guide 60 extends perpendicularly with respect to the first guide 52 (shown in FIG. 3) and is formed on the gear shifting displacement piece 32.

Figure 6A:
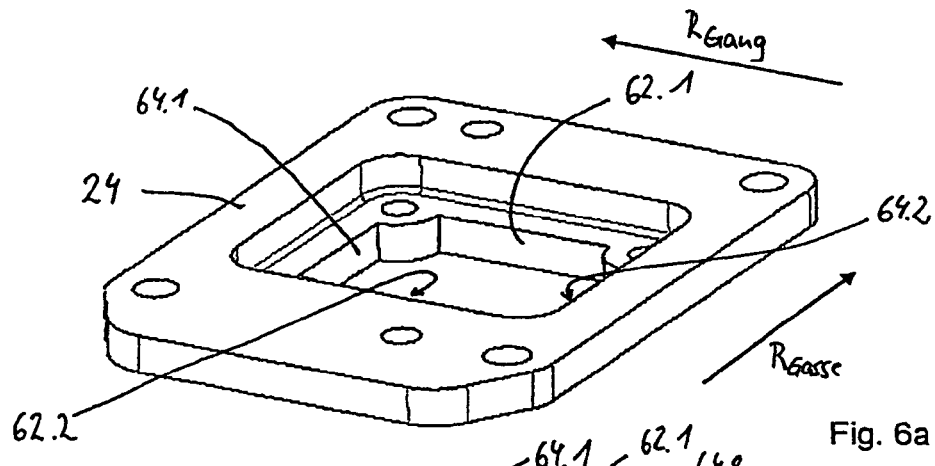
FIGS. 6a, 6b and 6c show an adapter for connecting the gear actuator to a transmission in accordance with an embodiment of the present invention.

FIG. 6a shows an adapter 24' of a gear actuator in accordance with a second embodiment of the present invention. The adapter 24' is configured to be fastened, ideally screwed firmly, to the central body 26 (cf. FIG. 1) on one side and to a transmission on the other side. The adapter recess 28 is configured such that its boundaries 62.1, 62.2 can form a gate drive stop 62. Boundaries 64.1, 64.2 can form a gear drive stop 64. As an alternative, the gear drive stop is formed on the gear shifting displacement piece 32 that comes into contact with the central body 26 (cf. FIG. 1).

Figure 6B:
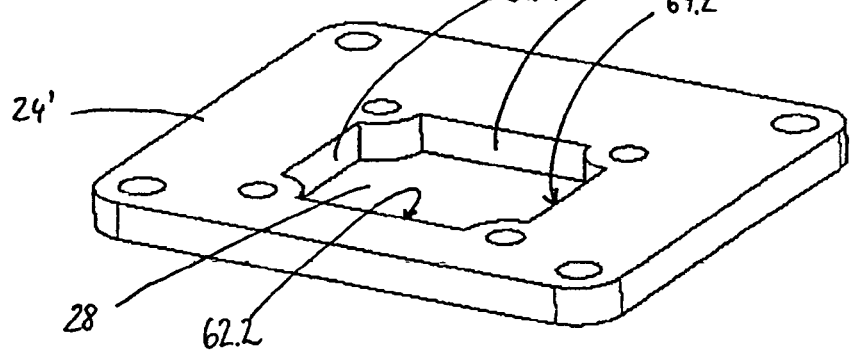

FIG. 6b shows the adapter 24 for a transmission that requires a smaller stroke of the selector finger than the transmission for which the gear actuator with the adapter 24' according to FIG. 6a is used. To this end, the adapter recess 28 is of smaller configuration. In other words, the spacing between the two boundaries 62.1 and 62.2 of the gate drive stop 62 is smaller than in the case of the adapter according to FIG. 6a. In this way, the stroke in the gate shifting working direction $R_{Gause}$ is shortened. In the same way, the spacing between the two sides 64.1 and 64.2 of the gear drive stop 64 is smaller than in the case of the adapter 24 according to FIG. 6a, with the result that a stroke in the gear shifting working direction $R_{Gang}$ is also smaller in the case of the adapter 24' according to FIG. 6b than in the case of the adapter 24 according to FIG. 6a.

Figure 6C:
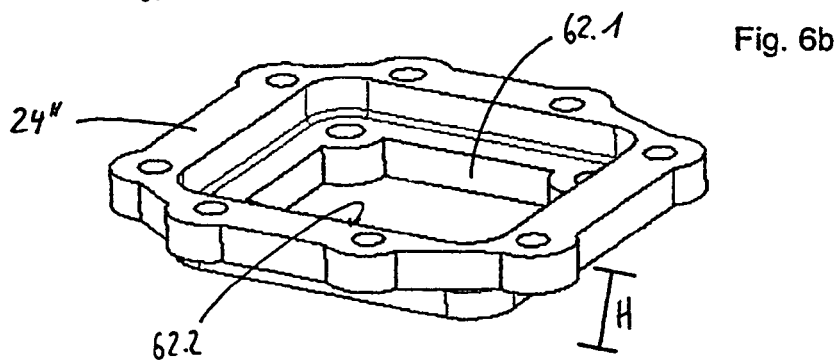

FIG. 6c shows a further embodiment of an adapter 24" in which the gate drive stop 62 does not reach completely with its walls 62.1 and 62.2 through a height H of the adapter 24".

Figure 7:
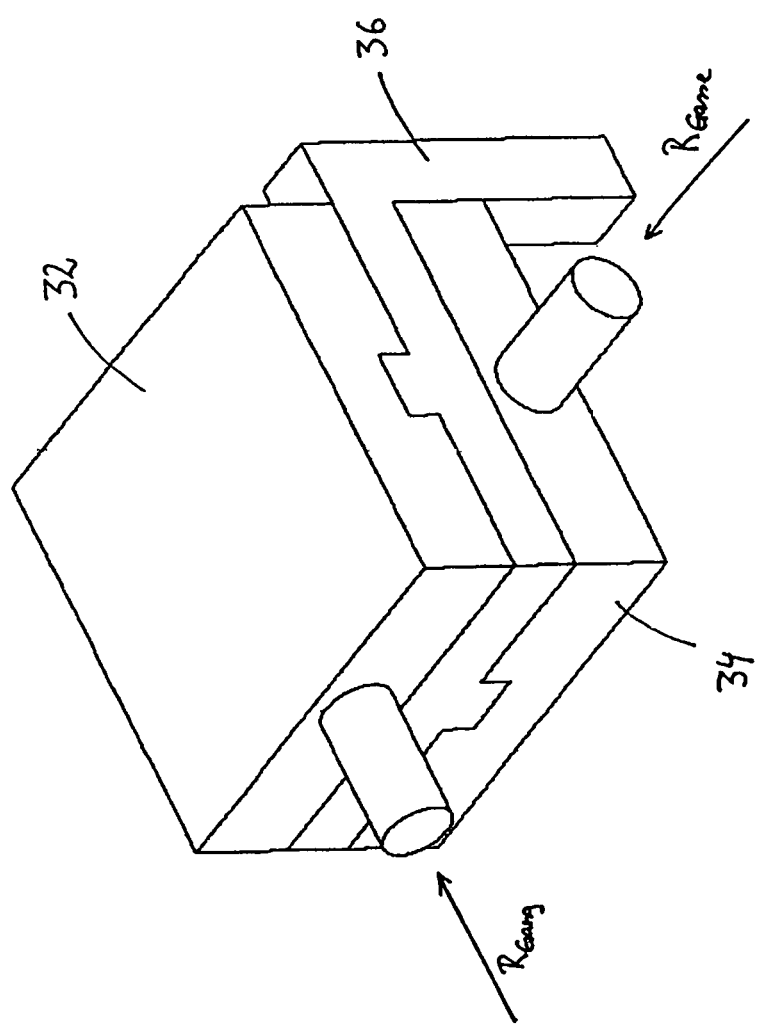
FIG. 7 is a diagram illustrating the mounting of the selector finger on the gate shifting displacement piece and on the gear shifting displacement piece in accordance with an embodiment of the present invention.

FIG. 7 illustrates the basic principle of the gear actuator. The gear shifting working direction $R_{Gang}$ and the gate shifting working direction $R_{Gasse}$ are added vectorially via two linear guides firstly in the gear shifting displacement piece 32 and secondly the gate shifting displacement piece 34. FIG. 7 shows that the selector finger 36 can also be arranged on the side of the displacement pieces 32, 34.

It will be seen that the objects set forth above, among those made apparent from the preceding description, are efficiently attained, and since certain changes may be made without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention that, as a matter of language, might be said to fall therebetween.

What is claimed is:

1. A gear actuator for shifting a transmission, comprising:
a gate shifting drive;
a gear shifting drive;
a selector finger movable by the gate shifting drive and by the gear shifting drive for transmitting a shifting movement to the transmission;
a gate shifting displacement piece connected to the gate shifting drive, wherein the gate shifting drive has a linear gate shifting working direction; and
a gear shifting displacement piece connected to the gear shifting drive wherein the gear shifting drive has a linear gear shifting working direction;
wherein the selector finger is mounted on the gate shifting displacement piece and the gear shifting displacement piece, and extends through the gate shifting displacement piece such that a first end of the selector finger is coupled to the gear shifting displacement piece and a second end of the selector finger protrudes away from the gate shifting displacement piece to engage the transmission, the selector finger being guided displaceably in any one of the linear gate and gear shifting working directions to engage the transmission.

2. The gear actuator as claimed in claim 1, wherein the gear shifting working direction extends substantially perpendicularly with respect to the gate shifting working direction.

3. The gear actuator as claimed in claim 1, wherein the selector finger is mounted on the gate shifting displacement piece and the gear shifting displacement piece such that it is guided by a frictional connection.

4. The gear actuator as claimed in claim 1, further comprising a securing piece configured to ensure that the selector finger engages only one selector rod of the transmission.

5. The gear actuator as claimed in claim 4, wherein the securing piece is attached to the gate shifting displacement piece.

6. A gear actuator for shifting a transmission, comprising:
a latching contour;
a gate shifting drive;
a gear shifting drive;
a selector finger movable by the gate shifting drive and by the gear shifting drive for transmitting a shifting movement to the transmission;
a gate shifting displacement piece connected to the gate shifting drive, wherein the gate shifting drive has a linear gate shifting working direction; and
a gear shifting displacement piece connected to the gear shifting drive wherein the gear shifting drive has a linear gear shifting working direction;
wherein the selector finger is mounted on the gate shifting displacement piece and the gear shifting displacement piece, and extends through the gate shifting displacement piece such that a first end of the selector finger is coupled to the gear shifting displacement piece and a second end of the selector finger protrudes away from the gate shifting displacement piece to engage the transmission, the selector finger being guided displaceably in any one of the linear gate and gear shifting working directions to engage the transmission, wherein the gear shifting working direction extends substantially perpendicularly with respect to the gate shifting working direction, and wherein the gear shifting displacement piece has a prestressed latching pin that interacts with the latching contour for latching the selector finger in a predefined position in the gear shifting working direction.

7. The gear actuator as claimed in claim 1, wherein the gate shifting displacement piece is arranged closer to the transmission in the installation position of the gear actuator than is the gear shifting displacement piece.

8. The gear actuator as claimed in claim 1, wherein the gate shifting drive comprises one of a gate shifting pneumatic cylinder and a gate shifting hydraulic cylinder.

9. The gear actuator as claimed in claim 1, wherein the gear shifting drive includes a gear shifting cylinder; the gear shifting cylinder including a first set of valve connections arranged on a first lateral side of the gear shifting cylinder, and a second set of valve connections arranged on a second lateral side of the gear shifting cylinder; the gear shifting cylinder being configured such that a non-synchronized transmission is shiftable by the first set of valve connections, and a synchronized transmission is shiftable by both the first set and the second set of valve connections.

10. The gear actuator as claimed in claim 2, further comprising a gate drive stop configured to limit a maximum gate drive movement path in the gate shifting working direction.

11. The gear actuator as claimed in claim 2, further comprising a gear drive stop for limiting a maximum gear drive movement path in the gear shifting working direction.

12. A commercial vehicle transmission system, comprising a transmission; and a gear actuator as claimed in claim 1.

13. The transmission system as claimed in claim 12, further comprising an adapter configured to connect the gear actuator to the transmission.

14. The transmission system as claimed in claim 13, further comprising a gear drive stop one of formed on and fastened to the adapter.

15. The gear actuator as claimed in claim 1, wherein the gear shifting drive comprises one of a gear shifting pneumatic cylinder and a gear shifting hydraulic cylinder.

16. The gear actuator as claimed in claim 1, wherein the selector finger is guided displaceably in any one of the linear gate and gear shifting working directions to engage at least one selector rod of the transmission.

17. A gear actuator for shifting a transmission, comprising:
a gate shifting drive;
a gear shifting drive;
a selector finger movable by the gate shifting drive and by the gear shifting drive for transmitting a shifting movement to the transmission;
a gate shifting displacement piece connected to the gate shifting drive, wherein the gate shifting drive has a linear gate shifting working direction; and
a gear shifting displacement piece connected to the gear shifting drive wherein the gear shifting drive has a linear gear shifting working direction;
wherein the selector finger is mounted on the gate shifting displacement piece and the gear shifting displacement piece, and extends through the gate shifting displacement piece such that a first end of the selector finger is coupled to the gear shifting displacement piece and a second end of the selector finger protrudes away from the gate shifting displacement piece to engage the transmission, the selector finger being guided displaceably with respect to each of the gate shifting displacement piece and the gear shifting displacement piece.

18. The gear actuator as claimed in claim 1, wherein the selector finger extends through a recess of the gate shifting displacement piece.

19. The gear actuator as claimed in claim 1, wherein the selector finger extends through an opening of the gate shifting displacement piece from an upper end of the opening to a lower end of the opening such that at least a portion of the selector finger is guided displaceably within the opening in the linear gear shifting working direction.

20. The gear actuator as claimed in claim 17, wherein the selector finger extends through a recess of the gate shifting displacement piece.

21. The gear actuator as claimed in claim 17, wherein the selector finger extends through an opening of the gate shifting displacement piece from an upper end of the opening to a lower end of the opening such that at least a portion of the selector finger is guided displaceably within the opening in the linear gear shifting working direction.

* * * * *